Nov. 29, 1932.    R. D. MERSHON    1,889,415

EXCITED ELECTROLYTIC CONDENSER

Filed Nov. 6, 1928

Inventor
R. D. Mershon
By his Attorneys
Cooper, Kerr & Dunham

Patented Nov. 29, 1932

1,889,415

UNITED STATES PATENT OFFICE

RALPH D. MERSHON, OF NEW YORK, N. Y.

EXCITED ELECTROLYTIC CONDENSER

Application filed November 6, 1928. Serial No. 317,610.

In the use of excited electrolytic condensers the exciting current can be obtained in various ways, as for example from a battery, from a direct current generator, or from a rectifier connected to an alternating current source, which may be the circuit on which the condenser is used or the mains with which such circuit is connected. The electrolytic rectifier at once suggests itself for the purpose, but as heretofore made such rectifiers suffer from defects which are virtually prohibitive, especially for condensers of large capacity. For example, the best prior electrolytic rectifiers have low efficiency at temperatures around 40° C. and are virtually inoperative, if not entirely so, at boiling. Moreover, prior rectifiers require for good results an electrolyte which is unsuitable for use in a condenser, the reason being that for a condenser an electrolyte is desired in which a durable film can be formed and maintained whereas in a rectifier the film must break down and build up again in each cycle, and hence the electrolyte should be one capable of forming very rapidly a film which will break down readily when the impressed voltage is directed toward the electrodes but which will have the necessary high resistance to current flow when the voltage is toward the electrolyte. It happens, however, that electrolytes which produce the durable films desired for condenser use are slow-acting in film-formation and hence have been considered unsuitable for rectifiers.

I have found that by making the rectifier electrodes of metal less readily filmed than the metal of the condenser electrodes, films having the characteristics desirable in a rectifier may be formed in an electrolyte suitable for condenser use, as for example the highly advantageous borax and boric acid electrolyte, preferably one containing one-half pound of anhydrous sodium tetraborate and one and a half pounds of boric acid per gallon. As electrolyte I may also use one containing borax alone; or sodium or potassium hydroxide; or sodium phosphate with or without boric or phosphoric acid. With such an electrolyte the rectifier will operate at boiling temperature with good efficiency and I can therefore put the rectifier electrodes in the same electrolyte as the condenser electrodes are immersed in, thus providing a self-contained condenser unit which requires no external source of excitation voltage.

The metal used for the rectifier electrodes may be an alloy of the anode metal (which may, as is well known, be aluminum or magnesium) containing a metal which does not film at all, or films less readily than the anode metal itself, in the condenser electrolyte; as for example an aluminum alloy containing copper, magnesium, or tantalum, or in some cases titanium, or two or more such metals; or as a further example of magnesium alloy containing aluminum. Preferably I use an aluminum-copper alloy, which I find gives excellent results. It is, moreover, cheap and readily obtainable. An alloy containing about 8 per cent copper has been found satisfactory and is preferred. With this alloy the rectifier can have an efficiency of more than 50 per cent at boiling temperature.

The use of a boric acid and borate electrolyte affords in itself a very important advantage, inasmuch as the borates formed by the electrolytic action are soluble in the electrolyte, whereas the phosphates or phosphides formed with a phosphate electrolyte are insoluble and by clinging to the electrodes on which they are formed interfere with the efficient operation of the rectifier.

Referring now to the accompanying drawing, in which several embodiments of my invention are illustrated diagrammatically:

Figure 1:
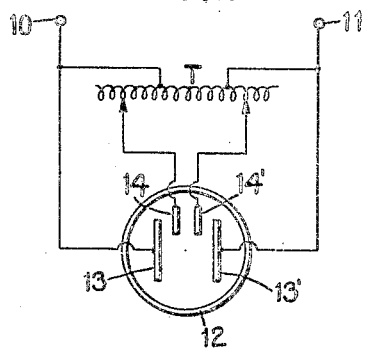
Fig. 1 shows an electrolytic condenser and a "full-wave" electrolytic exciting rectifier in the same tank or receptacle, with an autotransformer for stepping up the voltage impressed on the rectifier.

Throughout the drawing, 10, 11 represent the terminals by which the apparatus may be connected to an alternating current source or circuit and 12 represents the container of the rectifier and condenser. 13, 13', 14, 14' are the condenser electrodes and rectifier electrodes, respectively, of which any suitable number may be used, as will be readily understood.

In Fig. 1 the rectifier is of the full-wave type, with its electrodes 14, 14' connected to a step-up auto transformer T connected across the input terminals 10, 11.

Figure 5:
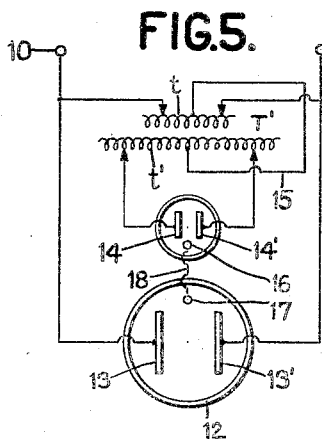
Fig. 5 shows an arrangement in which the rectifier is in a separate vessel, with a transformer having separate primary and secondary windings to deliver current of suitable voltage to the rectifier.

In this embodiment the exciting circuit may be traced as follows: from one of the rectifier electrodes 14 or 14' through the autotransformer, the condenser anodes 13, 13', and the electrolyte back to the rectifier electrode. Of course a transformer having separate windings may be used if desired, and the rectifier may be in a separate vessel or tank, as in Fig. 5 for example. In this figure the primary $t$ of the transformer T' is connected across the condenser terminals 10, 11, and the secondary $t'$ is connected to the rectifier electrodes 14. The middle or neutral points of the two windings are connected by wire 15 and the electrolytes are connected by non-filming electrodes 16, 17 (which may be any suitable material) and wire 18.

Figure 2:
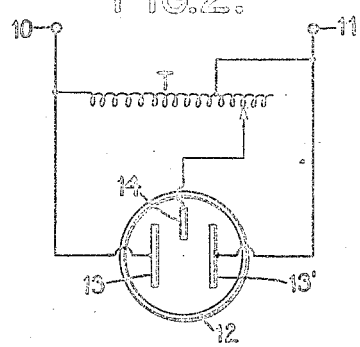
Fig. 2 shows the same type of apparatus but using a half-wave rectifier.

The arrangement shown in Fig. 2 will be recognized as the same as that of Fig. 1 except that a half-wave rectifier is used. In these figures, and also in Fig. 5, the voltage impressed on the rectifier is higher than that impressed on the condenser, as will be readily understood.

Figure 3:
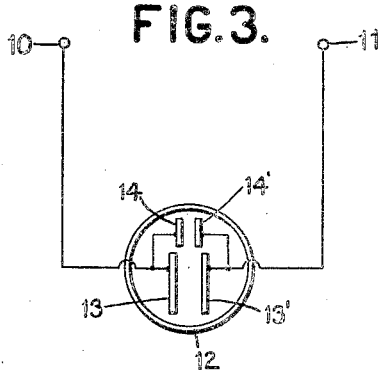
Fig. 3 illustrates an apparatus in which a full-wave exciting rectifier is used, with the same value of impressed voltage on the rectifier as on the condenser.
Figure 4:
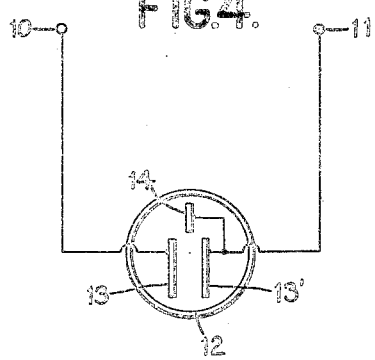
Fig. 4 shows an embodiment similar to Fig. 3 but using a half-wave rectifier.

With rectifier metal sufficiently different from aluminum in its film-forming characteristics, as for example the 8 per cent copper alloy referred to, adequate excitation may in some cases be obtained without impressing on the rectifier a higher voltage than is impressed on the condenser; in which case the rectifier electrodes may be connected directly to the condenser anodes, as in Fig. 3 for example, using full-wave rectification, or as in Fig. 4, using half-wave rectification. In fact the rectifier electrodes may even be carried by and made a part of the condenser anodes, as by welding them thereon.

When the electrode or electrodes of the exciting rectifier are in the same vessel as the condenser anodes, as in Fig. 3 for example, the rectifier serves as an effective by-pass for current leaking through the anode films into the electrolyte. Thus, in Fig. 3, if the instantaneous direction of the alternating current is from terminal 10 to terminal 11, any current leaking through the film on anode 13 will find a path of lower resistance through the rectifier electrode 14' than through the anode 13'. Hence the condenser films are not subject to injury by flow of leakage current from the electrolyte. In other words the anodes do not become negative with respect to the electrolyte except to the extent of such voltage drop as may occur between the condenser anodes and the rectifier electrodes. The same is also true for the arrangement shown in Fig. 1, for example.

Figure 6:
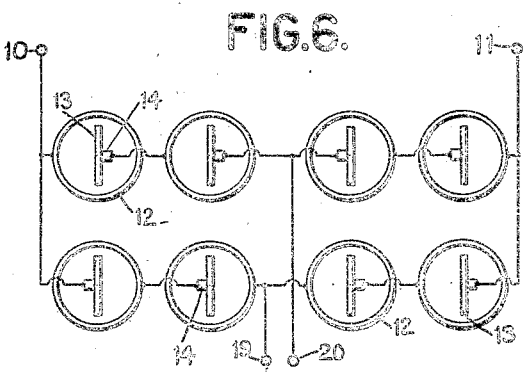
Fig. 6 shows a combined condenser-rectifier system designed especially for use where it is desired to obtain from alternating current substantially "pure" direct current free from alternating current "ripple", as in radio and telephony.

My invention also finds advantageous use in a "filtering" system for decreasing or eliminating the so-called "A. C. ripple" in the output of a rectifier, as desired for example, in radio and telephony. In such cases the rectifier electrodes can be in the same vessels as the electrolytic condensers employed for "smoothing" the rectifier output, with the advantage that a higher voltage may be obtained at the filter output terminals. A simple arrangement for such purpose, utilizing both halves of the wave, that is, full-wave rectification, is shown in Fig. 6. In this figure the vessels or tanks 12 serve as negative terminals for the condensers and as positive terminals for the rectifier units, for which purposes the tanks are made of copper. Each condenser has a filmed anode 13 and welded thereon is a rectifier electrode 14. Terminals 19, 20 are provided for the output, and may be connected with one or more reactance or choke coils and additional condensers, not shown. Remembering that the rectifier films break down easily under the stress of potential directed from the electrolyte toward the electrode, it will be seen that when an alternating voltage is impressed on terminals 10, 11, the voltage at terminal 19 is always positive. At the same time the condensers composed of the anodes 14 and copper cathodes 12, especially if they are of large capacity, greatly diminish the extent of the voltage fluctuations appearing at the output terminals.

It is to be understood that the invention is not limited to the specific embodiments herein illustrated and described but can be embodied in other forms without departure from its spirit as defined by the appended claims.

I claim—

1. An electrolytic condenser and an electrolytic rectifier electrically connected thereto, having filmed electrodes, the condenser films being resistant to breakdown and the rectifier films being readily broken down, and electrolyte means of the same chemical composition in which said electrodes are immersed to re-form thereon films of the same characteristics after break-down, the electrode metal of the rectifier being an aluminum alloy.

2. The combination with an electrolytic condenser comprising at least one aluminum anode and an electrolyte adapted to form durable films on aluminum, of an electrolytic rectifier connected with the condenser and having at least one filmed electrode composed of aluminum alloy capable of forming less durable films in an electrolyte of the same composition.

3. The combination with an electrolytic condenser comprising a positive terminal, at least one filmed aluminum anode connected therewith, and a borax-boric acid electrolyte, of at least one electrolytic rectifying electrode of aluminum alloy immersed in the same electrolyte and connected with the said positive terminal.

4. The combination with an electrolytic condenser comprising a positive terminal, at least one aluminum anode connected therewith, and a borax electrolyte devoid of phosphate, of at least one electrolytic rectifying electrode of aluminum-copper alloy immersed in the same electrolyte and connected with the said positive terminal.

5. A combined electrolytic condenser and exciting unit, comprising filmed aluminum positive electrodes, at least one rectifying electrode of aluminum alloy containing a metal adapted to cause rapid formation of films readily broken down by voltage directed from the electrolyte to the electrodes, and an electrolyte in which said electrodes are immersed, containing borax and boric acid and devoid of phosphate.

6. An electrolytic rectifier comprising at least one rectifying electrode of aluminum-copper alloy, and a borax-boric acid electrolyte devoid of phosphate.

7. The combination with an electrolytic condenser comprising at least one anode of filming metal and an electrolyte immersing the same adapted to produce on the anode metal a durable film resistant to break-down by voltage reversal, of an electrolytic rectifier connected with the condenser and having at least one electrode of aluminum alloy capable of forming in an electrolyte of the same chemical composition films of less resistance to break-down by voltage reversal.

8. The combination with an electrolytic condenser comprising at least one filmed anode and an electrolyte, a rectifier having at least one electrode of aluminum alloy immersed in the same electrolyte, and transformer means for impressing on the rectifier an alternating voltage of higher value than on the condenser.

9. The combination with transformer means for supplying alternating voltages of different values, of an electrolytic rectifier having an acid electrolyte and at least one electrode of aluminum alloyed with at least one metal selected from the group comprising magnesium, copper, tantalum and titanium, and an electrolytic condenser having at least one filmed anode immersed in the said acid electrolyte, the rectifier and the condenser being associated with said transformer means to have alternating voltage impressed thereby on both, that on the rectifier being of higher value than that on the condenser.

10. The combination with means for supplying alternating voltages of different values, of an electrolytic rectifier having an electrolyte containing borax and boric acid in solution and having at least one electrode of aluminum alloyed with at least one metal selected from the group comprising magnesium, copper, tantalum and titanium, and an electrolytic condenser having at least one filmed anode immersed in the said acid electrolyte, the rectifier and the condenser being associated with said means to have voltage of higher value impressed on the rectifier than on the condenser.

11. An electrolytic rectifier having an electrolyte and at least one electrode of aluminum alloy containing magnesium and copper.

12. An electrolytic rectifier having an acid electrolyte and at least one electrode of aluminum alloy containing magnesium and copper.

13. The combination with a course of alternating voltage, and a transformer connected thereto adapted to supply secondary voltage of higher value than the primary voltage, of an electrolytic condenser having a primary voltage impressed upon it and comprising an electrolyte and at least one filmed anode immersed in the electrolyte, and an electrolytic rectifier connected with the condenser to excite the same and having the secondary voltage impressed upon it, said rectifier comprising at least one filmed electrode immersed in the said electrolyte, the rectifier electrode being composed of an aluminum alloy containing at least one metal selected from the group consisting of magnesium, copper, tantalum and titanium.

In testimony whereof I hereto affix my signature.

RALPH D. MERSHON.